July 17, 1956 A. J. SKALKA 2,754,984
HAYSTACKING MECHANISM
Filed Dec. 3, 1953 3 Sheets-Sheet 1

INVENTOR
ALBERT J. SKALKA
Arthur H. Sturges
ATTORNEY

July 17, 1956  A. J. SKALKA  2,754,984
HAYSTACKING MECHANISM
Filed Dec. 3, 1953  3 Sheets-Sheet 2

INVENTOR
ALBERT J. SKALKA
Arthur H. Sturges
ATTORNEY

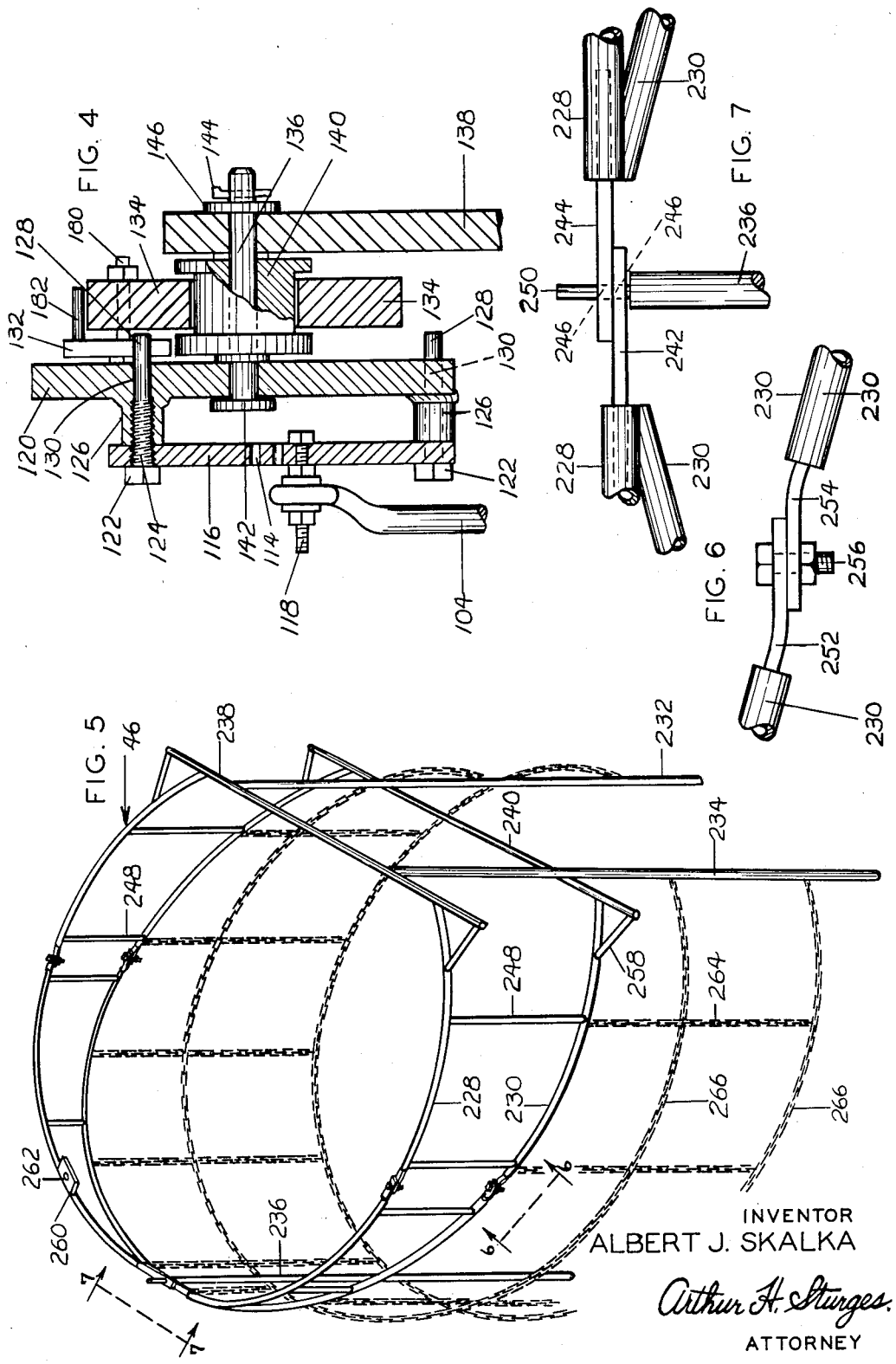

United States Patent Office 2,754,984
Patented July 17, 1956

2,754,984

HAYSTACKING MECHANISM

Albert J. Skalka, Deweese, Nebr.

Application December 3, 1953, Serial No. 395,899

3 Claims. (Cl. 214—131)

This invention relates to farming and particularly harvesting machinery of the type adapted to be attached to a tractor, and in particular an attachment for forming stacks with loose hay wherein a swinging cradle or hay rack is supplied with hay by a forked hay loader attached to a tractor and the hay rack is actuated by a hydraulic ram to deposit the hay in a suitable hay retainer.

The purpose of this invention is to provide a portable hay stacker for accumulating hay in comparatively small stacks in which the stacker is adapted to be actuated by one man on a towing tractor.

Various types of rakes, forks, and similar devices have been provided for gathering, picking up and loading hay in fields, however, with modern equipment, and in order to expedite curing hay it is desirable to form stacks of loose hay, and in order to form such stacks economically it is also desirable to provide mechanically operating instrumentalities that are adapted to be actuated by one man on a towing tractor.

With this thought in mind this invention contemplates a mounting frame having an engine or a motor thereon with a pump driven by the engine and adapted to provide fluid under pressure for a hydraulic cylinder which actuates elongated arms pivotally mounted on the frame and on the extended ends of which a hay fork or rack is carried whereby the rack is adapted to be lowered to receive a load of hay and is also adapted to carry the hay to an upwardly disposed position from which the hay may be deposited upon a stack or into a hay retainer.

The object of this invention is, therefore, to provide means for forming a hay stacking mechanism whereby stacks of loose hay may be formed by a single operator on a tractor to which the mechanism is attached.

Another object of the invention is to provide a portable hay stacking attachment for a tractor in which the size of stacks of hay formed with the attachment is readily adjustable.

Another important object of the invention is to provide actuating means for a carrier of a mechanical hay stacker in which the travel of the carrier is changed with each stroke to compensate for the increasing height and size of the stack.

A further object of the invention is to provide a retainer for hay being stacked in which the retainer is extensible, and retractable whereby larger or smaller stacks of hay may be formed therewith.

A still further object of the invention is to provide a combination hay stacker and retainer in which the device, in its entirety, is adapted to be transported from one position to another so that groups or rows of hay stacks may be formed thereby.

It is yet a still further object of the invention to provide a portable hay stacker and retainer in which the device is of a simple and economical construction.

With these and other objects and advantages in view the invention embodies a horizontally disposed frame having a pair of elongated side beams with a retainer carried by the rear end, spaced elongated upwardly disposed arms pivotally mounted on and spaced from the rear end of the frame, a cradle carried by the upper ends of the arms, a hydraulic cylinder or ram pivotally mounted on the frame and connected to the arms through struts and links for actuating the cradle, a motor driven pump mounted on the frame and adapted to supply fluid under pressure to the hydraulic cylinder, and suitable operating instrumentalities whereby the cradle is actuated to receive hay at the forward end of the frame and deposit the hay into the retainer at the opposite end.

Other features and advantages of the invention will appear from the following description taken in connection with the drawings, wherein:

Figure 4 is a cross section taken on line 4—4 of Figure 3 illustrating the construction and mounting of the pitch selector parts, and showing the parts on a still further enlarged scale.

Figure 5 is a perspective view showing the hay retainer.

Figure 6 is a detail taken on line 6—6 of Figure 5, with the parts shown on an enlarged scale and illustrating a connection between parts of the hay retainer frame.

Figure 7 is a detail looking from line 7—7 of Figure 5, also with the parts shown on an enlarged scale, and illustrating a connection between horizontal and vertical members of the hay retainer frame.

Figure 1:
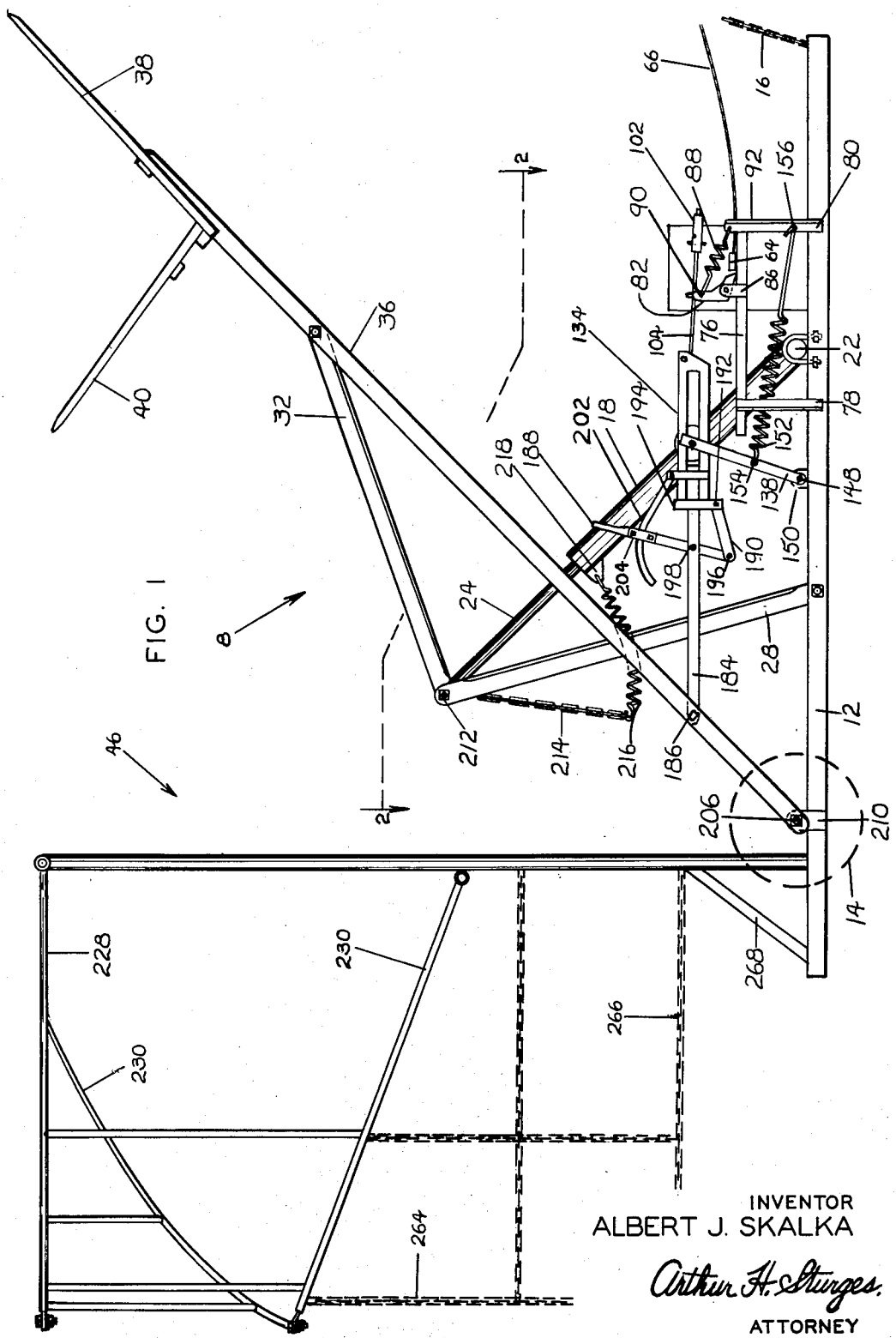
Figure 1 is a side elevational view illustrating the improved hay stacker showing the hay carrying cradle in an upwardly extended position and the hay retainer in a partly open position to facilitate showing the parts, and also showing ground engaging wheels in broken lines and upwardly disposed supporting chains on the forward ends of side beams of the frame of the stacker.
Figure 2:
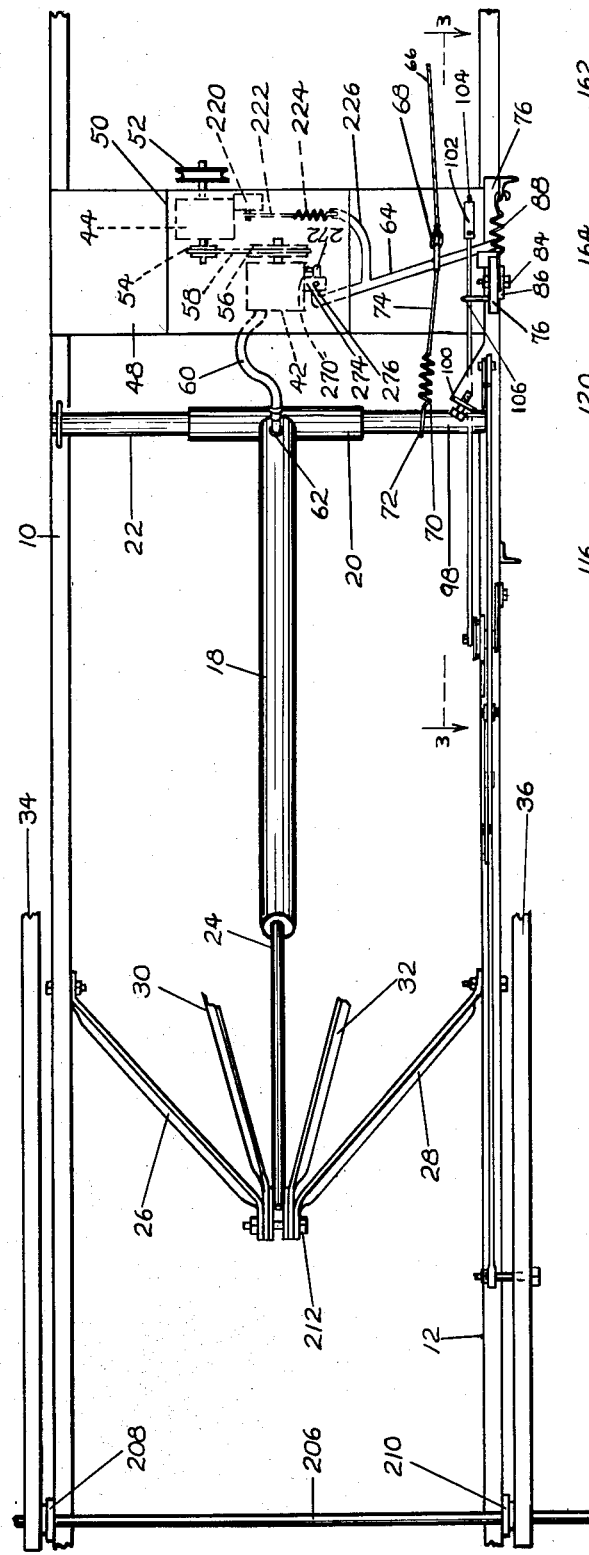
Figure 2 is a plan view of the hay stacker taken on line 2—2 of Figure 1, with the cradle carrying arms broken away and shown in section, and with the parts shown on an enlarged scale.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which the numeral 8 refers to the invention in its entirety, with numerals 10 and 12 indicating side beams of a supporting frame carried by wheels, as indicated by the broken lines 14 at the rear and adapted to be supported by chains 16 at the forward end, the frame having a hydraulic cylinder 18 pivotally mounted by a sleeve 20 and a transversely positioned shaft 22 on the side beams 10 and 12, and the cylinder having a piston rod 24 connected by struts 26 and 28 and links 30 and 32 to the frame and to arms 34 and 36, respectively, the arms carrying a cradle having horizontally disposed tines 38 and vertically disposed tines 40, and the cylinder 18, which is actuated by a pump 42 and an engine 44, actuating the cradle to deposit hay and the like into a retainer 46 mounted on the rear ends of the side beams.

The pump 42 and engine 44 are mounted on a platform 48 that extends across the side beams 10 and 12 and, as shown in Figure 1, the pump and engine are enclosed in a housing 50. A pulley 52 on the shaft of the engine 44 extends through the housing and is positioned to receive a starting rope or the like for manually starting the engine. The opposite end of the engine shaft is provided with a pulley 54 that is aligned with a pulley 56 on the shaft of the pump and a belt 58 trained over the pulleys 54 and 56 provides means for driving the pump from the engine.

The pressure or discharge side of the pump is connected by a hose 60 to a nipple 62 on the lower end of the hydraulic cylinder 18 whereby fluid is provided under pressure to drive the piston rod 24 upwardly to actuate the cradle.

The pump 42 and engine 44 are operated by a control lever 64 from which a cable 66 extends to a towing tractor, the cable being attached to the lever through a clevis 68. Upon drawing the control lever 64 forwardly by the cable 66 the throttle of the engine is opened and the pump is actuated to supply fluid under pressure to the cylinder 18, and upon release of the cable 66 and a latch mechanism, the lever 64 is returned by a spring 70, one end of which is connected to the shaft 22 with a loop 72, and the other to the lever 64 with a cable 74 which is connected to the clevis 68.

Figure 3:
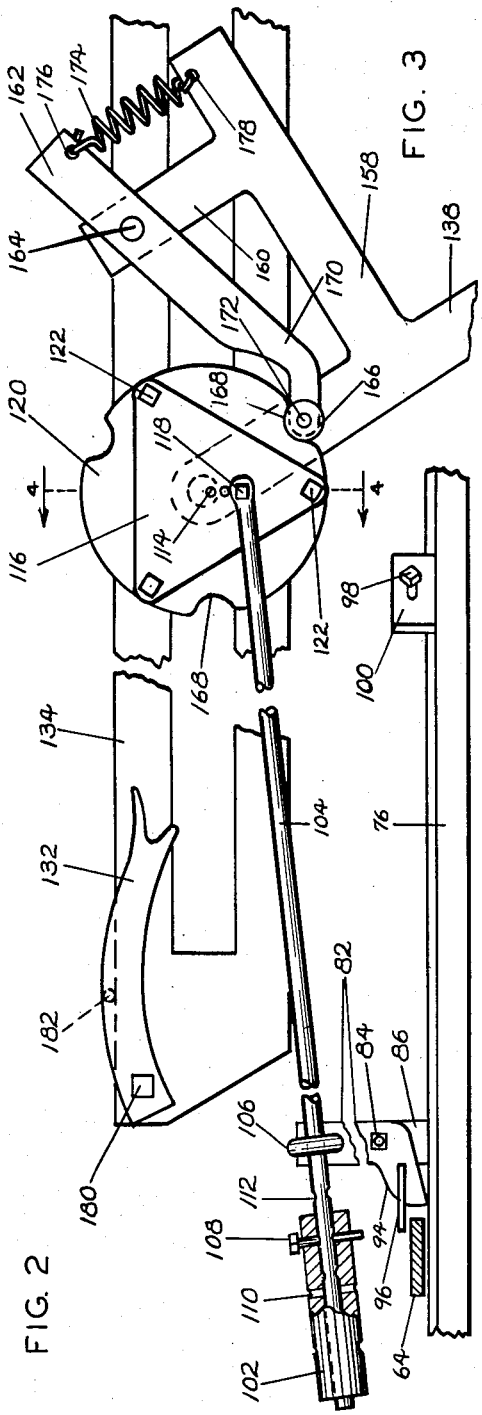
Figure 3 is a longitudinal section through the frame of the hay stacker taken on line 3—3 of Figure 2, and with the parts shown on a still further enlarged scale, and showing, in particular, the pitch selecting mechanism for actuating the control valves of a hydraulic pump and the governor of an internal combustion engine which operates the pump.

The extended end of the control lever 64 is positioned to slide on a horizontally disposed bar 76 which is supported from the side beam 12 with posts 78 and 80, and, as illustrated in Figures 1 and 3, the extended end of the control lever 64 is retained in the position with the engine operating by a latch 82 that is pivotally mounted by a pin 84 in a bearing 86 extended upwardly from the bar 76, and the latch is held in the position of holding the lever with a spring 88, one end of which is secured in an opening 90 in the latch 82, and the other secured to an ear 92 on the upper end of the post 80. The lower end of the latch 82 is provided with a pawl 94 that is positioned to be engaged by the lever 64, and the pawl is provided with a guide plate 96 which prevents the end of the lever 64 sliding upwardly over the pawl. The bar 76 is also provided with a stop formed with a cap screw 98 in a plate 100 whereby the return movement of the control lever 64 is limited.

The latch 82 retains the control lever 64 in the operative position until a sleeve 102 on a rod 104 engages an eye 106 on the upper end of the latch, as illustrated in Figure 3, and the sleeve 102 is adjustably secured to the rod 104 by a set screw 108 which is threaded in one of the openings 110 in the sleeve and positioned to extend into one of the ridges 112 in the rod 104.

The opposite or rear end of the rod 104 is secured, selectively, to one of the openings 114 in a triangular-shaped plate 116 with a bolt 118, and the plate is secured to a disc 120 with bolts 122. Each of the bolts 122 is provided with a threaded portion 124 that is threaded in a boss 126 extended from the disc, and also a stem 128 that extends through an opening 130 in the disc, and as shown in Figures 3 and 4 the extended ends of the stems are positioned to be engaged by a forked finger 132 carried by a cross-head frame 134.

The disc 120 is secured by a stud 136 to the upper end of a lever 138 and the stud is provided with a flanged roller 140 that is positioned to travel in an elongated slot of the cross-head frame 134. One end of the stud is provided with a head 142 and the opposite end is held by a cotter pin 144 and a washer 146. The lever 138 is pivotally mounted by a bolt 148 in an ear 150 on the side beam 12, and the lever is urged forwardly by a spring 152, one end of which is secured in an opening 154 in the lever, and the other in an opening 156 in the post 80.

The lever 138 is provided with an arm 158 on which is an extension 160 and, as shown in Figure 3, a bar 162 pivotally mounted on the extension with a bolt 164, carries a roller 166 that coacts with notches 168 in the periphery of the disc 120 to provide positioning means therefor. The roller is mounted on an offset end 170 with a pin 172, and the bar is provided with a spring 174 that urges the roller into the notches. One end of the spring is secured in an opening 176 in the bar 162 and the other in an opening 178 in the arm 158.

The forked finger 132 is pivotally mounted on the frame 134 with a bolt 180 and the finger is retained in operative position by a pin 182 that rides on the upper edge of the frame and holds the finger so that the forked end engages one of the stems 128 of the bolts 122 whereby the disc 120 is rotated 120° with each upward movement of the hay carrying cradle. When it is not desired to use the finger 132 it is rotated in a counter-clockwise direction so that it hangs downwardly without engaging the pins or stems of the disc 120.

The frame 134 is connected by a reach rod 184 to the cradle carrying arm 36, by which the frame and finger 132 are reciprocated, and the rod 184 is connected to the arm 36 with a bolt 186. The opposite end of the rod 184 is adjustably connected to the frame 134 with a hand lever 188 that is pivotally connected to the rear end of the frame with a link 190, one end of which is connected by a bolt 192 to a bar 194 on the end of the frame 134, and the other to the lower end of the hand lever 188 with a bolt 196. The hand lever is pivotally connected to the reach rod with a bolt 198 and the upper part of the lever is provided with a clamp 204 to adjustably secure it to an arcuate guide bar 202. By this means the travel of the hay carrying cradle is adjustable to compensate for stacks of different sizes.

The arms 34 and 36 are pivotally mounted on the mounting frame with a shaft 206 which is mounted in bearings 208 and 210 on the side bars 10 and 12, respectively. The shaft 206 is provided with extended ends upon which the wheels 14 are mounted.

The upper end of the piston rod 24 is pivotally connected to the struts 26 and 28, and links 30 and 32 with a bolt 212, and the lower end of a chain 214, depending from the bolt 212 is connected to the upper end of the hydraulic cylinder 18 with a spring 216, the spring being connected to an eye 218 on the wall of the cylinder. The spring and chain are provided to urge the arms 34 and 36 with the cradle backward or downwardly in the return movement after depositing the hay in the retainer.

The throttle of the engine 44 is actuated by a governor 220 and the governor is connected by a rod 222 and a spring 224 to an arcuate arm 226 extended from the control lever 64 which also actuates the fluid valve of the pump. Upon drawing on the cable 66 the end of the lever 64 is snapped under the pawl 94 of the latch 82 and the engine is started, thereby operating the pump and supplying fluid under pressure to the lower end of the cylinder 18. The cylinder, operating through the struts 26 and 28 and links 30 and 32, starts the cradle at the extended ends of the arms 34 and 36 from a position on the ground where it is filled with hay by a forked hay loader, or the like, and with continued movement of the piston rod 24 of the cylinder the cradle is carried over the hay retainer 46 into which the hay is deposited.

The hay retainer, which is circular in formation, comprises two substantially circular frames 228 and 230 supported at the front with posts 232 and 234, which are mounted on the side beams 10 and 12, respectively, and at the rear with a post 236. The ends of the frames are connected at the front with cross bars 238 and 240 and from these bars the frames converge toward the center at the rear where ends of side sections of the frame 230 are welded to the corresponding ends of side sections of the frame 228, and, as shown in Figure 7, the sections of the frame 228 are provided with plates 242 and 244 in which are openings 246 through which a pin 250 on the upper end of the post 236 extends. The frames 228 and 230 are retained in spaced relation with vertically disposed struts 248, as shown in Figure 5.

The sections of the frames are preferably formed in segments and the segments are joined, as illustrated in Figure 6, with plates 252 and 254 extended from ends thereof, and the plates are connected with bolts 256. The cross bars 238 and 240 are provided with braces 258 with which the ends are supported from the segments or frames, and the upper frame 228 is provided with an intermediate plate 260 having an opening 262 therein which is adapted to be placed over the pin 250 of the post 236 to provide means for retracting the size of the retainer.

The retainer is also provided with depending vertically disposed chains 264 which support horizontally disposed chains 266, to prevent hay spreading at the lower part of the stack, and as shown in Figure 5, the chains 266 are attached to the posts 232 and 234. The lower ends of the posts 232 and 234 are supported with diagonally disposed braces 268 which retain the posts in upright positions on the side beams 10 and 12.

In operation, the forward end of the supporting frame is connected to a tractor and with the rear end of the rod 104 positioned in one of the openings 114 of the plate 116, depending upon the size of a stack to be formed, and with the sleeve 102 set to a desired position on the opposite end of the rod, the control lever 64 is drawn forwardly until the end of the lever snaps under the pawl 94. In this position the engine and pump start operating and the operation continues with the finger 132 advancing the disc 120 120° with each stroke, or swinging action of the arms 34 and 36, until the sleeve 102 engages the eye 106 of the latch 82, at which time the pawl 94 is elevated and the spring 70 returns the control lever to the inoperative position.

The size of the stack depends upon the opening 114 selected, for connecting the rod 104 to the triangular-shaped plate 116, the opening positioned the greatest distance from the center being used for the larger stack and the opening close to the center being used for a smaller stack.

The travel of the hay carrying cradle is also adapted to be adjusted by the hand lever 188 which controls the connection between the reach rod and cross head frame.

With this combination of parts it is possible to form stacks of loose hay with hay or the like supplied to the cradle by a forked hay loader, or the like, and the device is adapted to be actuated by one man on a towing tractor, whereby the hay is picked up from a position on the ground and deposited in the hay retaining frame.

After forming a stack the hay retaining frame is swung apart and set up to form another stack at a different location.

It will also be understood that the mechanism of this invention may be used for loading a farm wagon, truck, or trailer.

Although it is preferred to use oil as the fluid other fluids may be used and, as shown in Figure 1, the fluid is returned to a sump, preferably in the pump, by a return valve having a stem 270 that is positioned to be actuated by an end 272 of the lever 64 which is pivotally mounted in ears 274 with a pin 276.

This device is particularly adapted to be operated by a single operator, such as a man on a towing tractor, and each time the cradle is loaded with hay a pull on the cable 66 starts another cycle of operations with the distance between the connection of the rod 104 to the plate 116 and the latch 82 increasing with each movement of the cradle.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and arrangement of details and parts, such as come within the purview of the invention claimed may be resorted to in actual practice, if desired.

Having now described the invention that which is claimed to be new and desired to be procured by Letters Patent, is:

1. A hay stacker comprising a horizontally disposed frame, arms pivotally mounted on the frame and extended upwardly therefrom, a hay carrying cradle carried by said arms, a hydraulic cylinder having a piston rod extended therefrom pivotally mounted on said frame, means operatively connecting the piston rod to said arms, means positioned on the frame for supplying fluid under pressure to said cylinder for elevating the arms and cradle, a cross head having an elongated slot therein mounted on the frame and operatively connected to one of the cradle carrying arms, a disc having spaced notches in the peripheral surface and spaced pins extended therefrom rotatably mounted on a stud extended through the slot of the cross head, a lever positioned with one end pivotally mounted on the frame and the other pivotally connected to the stud, a spring actuated roller positioned to coact with the notches of the disc for retaining the disc in adjusted positions, a finger on the cross head positioned to engage the pins of the disc with each operation of the cradle, a lever operatively connected to the fluid supplying means, a latch for retaining the lever in a position whereby fluid is supplied to the cylinder, means operatively connecting the latch to the disc for alternately relieving and supplying fluid under pressure from and to the cylinder, and means for adjusting the means for connecting the latch to the disc whereby stacks of different sizes are formed by the stacker.

2. In a hay stacking mechanism, the combination which comprises a horizontally disposed supporting frame, a hay carrying cradle pivotally mounted on the frame, a hydraulic cylinder pivotally mounted on the frame and operatively connected to the cradle, fluid supply means carried by the frame and connected to the cylinder, a control lever for actuating the fluid supplying means, a latch for retaining the control lever in the operative position, a cross head mounted on the frame and adjustably connected to the cradle mounting means, a disc having spaced pins extended therefrom mounted on the frame and positioned adjacent to the cross head, a finger carried by the cross head and positioned to, alternately, engage the pins of the disc for rotating the disc, friction means for retaining the disc in operative positions in relation to the pins, adjustable means for actuating the latch by the disc for releasing the control lever, and means for actuating the control lever from a towing tractor.

3. In a hay stacking mechanism, the combination which comprises a horizontally disposed supporting frame mounted, at one end on wheels and adapted to be connected to a tractor at the other, upwardly extended arms pivotally mounted on the frame, a cradle carried by the upper ends of the arms, a hydraulic cylinder pivotally mounted on the frame and having a piston rod extended therefrom, struts pivotally mounted on the frame and connected to said piston rod, links connecting the struts and piston rod to said arms, a pump mounted on the frame and connected to the cylinder, a control lever for operating the pump, a cable extended from the control lever for actuating the lever from a tractor, a latch for retaining the control lever in a position with the pump operating, a cross head mounted to slide longitudinally of the frame, means for connecting the cross head to an arm of the cradle whereby the cross head is reciprocated with each movement of the cradle, a disc having a triangular-shaped plate spaced from one side and having pins extended therefrom rotatably mounted on the frame and positioned adjacent to the cross head, a forked finger carried by the cross head and positioned to engage one of the pins extended from the disc for actuating the disc with each movement of the cradle, spacing means frictionally engaging the disc, a rod adjustably connected to the triangular-shaped plate of the disc and adjustably connected to the latch for actuating the latch to release the control lever, and resilient means for returning the control lever to the inoperative position.

References Cited in the file of this patent

UNITED STATES PATENTS

| | | |
|---|---|---|
| 1,301,643 | Blank | Apr. 22, 1919 |
| 1,805,028 | Anthony et al. | May 21, 1931 |
| 2,491,079 | Bestland | Dec. 13, 1949 |
| 2,501,231 | Mefferd | Mar. 21, 1950 |
| 2,660,322 | Richey | Nov. 24, 1953 |
| 2,665,016 | Etchart | June 5, 1954 |